Figure 1:
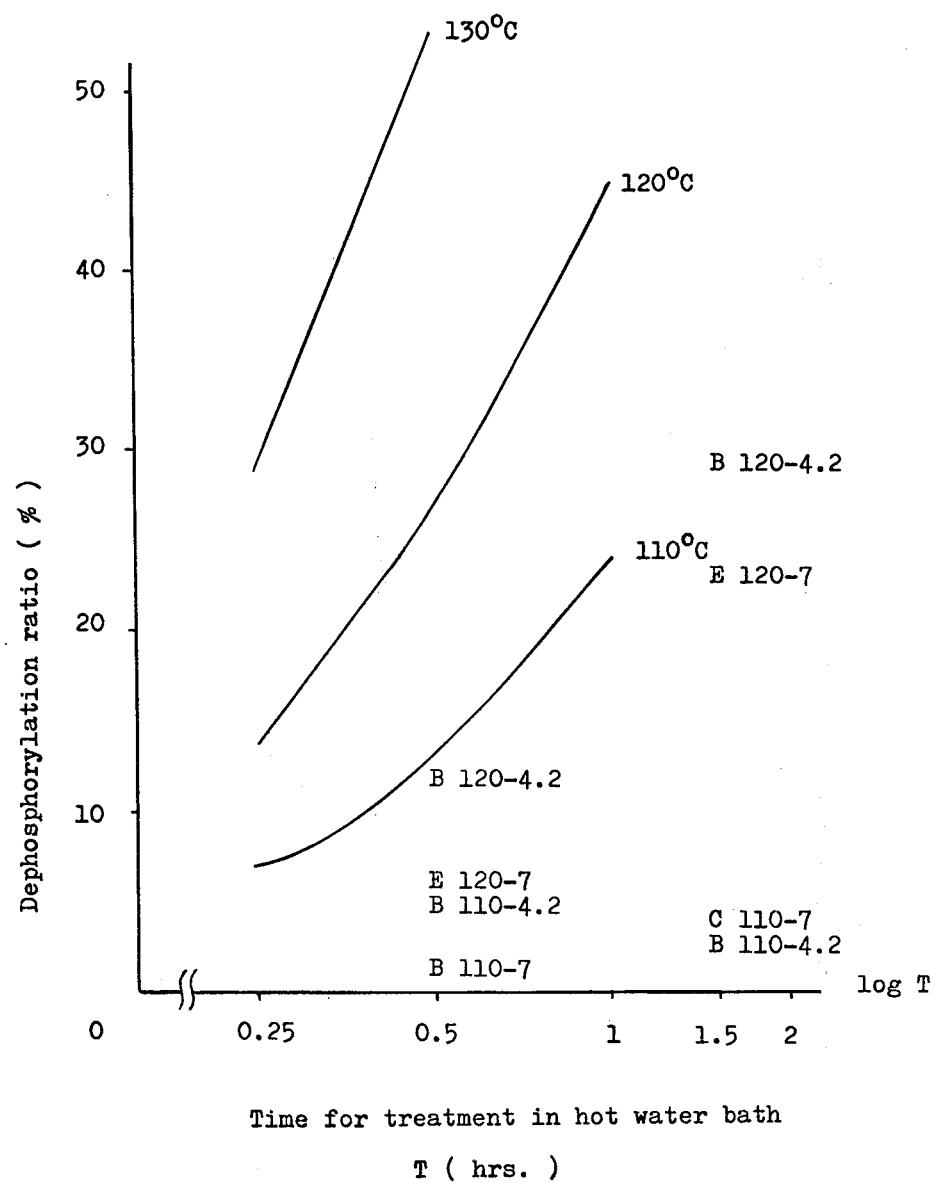

United States Patent [19]

Kawai et al.

[11] 4,165,392

[45] Aug. 21, 1979

[54] PROCESS FOR PRODUCING FIBROUS HIGH-PROTEIN FOOD

[75] Inventors: Syuji Kawai; Shuzo Ohyabu, both of Kurashiki; Takeo Akiya, Takatsuki; Shunichiro Horio, Hirakata; Naoki Yagi, Suita; Kwang Y. Kim, Habikino; Tarushige Nakaji, Yao, all of Japan

[73] Assignees: Kuraray Co., Ltd.; Minaminihon Rakuno Kyodo Kabushiki Kaisha, both of Japan

[21] Appl. No.: 760,293

[22] Filed: Jan. 17, 1977

[30] Foreign Application Priority Data

Nov. 12, 1976 [JP] Japan ............................ 51-136713

[51] Int. Cl.$^2$ ............................................... A23J 3/00
[52] U.S. Cl. ........................................ 426/657; 426/802
[58] Field of Search ............... 426/580, 657, 516, 517, 426/802, 656

[56] References Cited

U.S. PATENT DOCUMENTS

| 2,682,466 | 6/1954 | Boyer | 426/656 X |
| 2,813,794 | 11/1957 | Anson et al. | 426/802 X |
| 3,343,963 | 9/1967 | Kjelson | 426/802 X |
| 3,627,536 | 12/1971 | Arima et al. | 426/802 X |

FOREIGN PATENT DOCUMENTS 51-30141 8/1976 Japan .

*Primary Examiner*—Robert A. Voncoskie
*Attorney, Agent, or Firm*—Jones, Tullar & Cooper

[57] ABSTRACT

A process for producing a meat-simulating, fibrous high-protein food from a starting milk material such as a milk, a skim milk, a casein or the like, which comprises the steps of (1) converting the starting milk material into a fibrous composition by a known method such as gelling the starting milk material and applying a stress to the resulting gel composition; (2) after or during the conversion step, prestabilizing the resulting fibrous composition in an acidic bath of pH 0 to 5 containing 0.5 to 25% by weight of one or more specific acidic compounds for 10 seconds to 5 minutes; and then (3) actually stabilizing the resultant fibrous composition in a saline bath of pH 2.5 to 6.5 containing at least one salt selected from a potassium salt, a sodium salt or a calcium salt in an amount of 0.3 to 6 gram equivalents/L as the total cation concentration of the bath, at 90° to 130° C. for 20 minutes to 3 hours.

9 Claims, 3 Drawing Figures

PROCESS FOR PRODUCING FIBROUS HIGH-PROTEIN FOOD

The present invention relates to a process for the production of a fibrous high-protein food, more particularly to a process for the production of a fibrous high-protein food having excellent properties of texture, stability to hot water cooking or the like, by stabilizing a fibrous milk protein composition in two steps using an acidic bath and a saline bath.

Recently, various studies have been done on artificial fibrous protein foods such as a meat-simulating fibrous protein food and a few products are going to be commercialized.

The present inventors have already found a process for producing a meat-simulating milk protein food having a meat-like texture by applying a stress to a milk protein gel composition to form a fibrous composition and subjecting the resulting fibrous composition to a heat-treatment at 60° to 170° C. while preventing the substantial evaporation of water (Japanese Patent Application No. 46159/1976). The product of this process has excellent chewiness, elasticity, and stability to hot water cooking. However, on the other hand, the product also has some defects such as disappearance of the fibril (fine fibrillar structure)—orientation properties, decrease of the digestive ratio and the nutritive value as a protein, decrease in processability owing to discoloration (browning), a bitter taste, or the like, and it is difficult to eliminate these defects. For instance, when the product is produced by gelling a casein micelle with papain, applying a stress to the resulting gel and then subjecting the resulting fibrous composition to a heat-treatment in an autoclave at 120° C. for 45 minutes, the compressive breaking maximum stress of the product is similar to that of the muscular tissue portion of a raw beef meat and the orientated gel thus obtained has excellent elasticity and stability to hot water cooking. However, on a detailed observation, the product still has some defects in that the initial fine fibrillar structure almost disappears, the digestive ratio and the nutritive value as protein are clearly lower than those before the treatment, slight browning is observed, and the taste becomes bitter.

It is believed that the above defects result from side reactions such as breaking of the peptide chain of the protein to form oligopeptides, amidation or the like owing to the partially excessive decomposition of the protein, as well as becoming amorphous and denaturation of the protein during the severe and long reaction.

Generally, among various kinds of proteins, a milk protein has the characteristic of formation of a highly elastic gel, by heating an aqueous solution thereof at an elevated temperature of more than 120° C. For instance, Thomas, Turner and Hyde have described that a chewy meat-loaf like food may be prepared by heating an emulsion of a mixture of a soy bean protein and fats and oils containing 14% by weight of a casein coprecipitate (water content 60 to 67%) at 121° C. for one hour (J. Food Technol. Vol. 11, Pages 51 to 58, 1976). A similar food using a casein solution is disclosed, for example, in U.S. Pat. No. 2,813,794. In these instances, there has been attempted to obtain a non-orientated gel. However, for the same reasons mentioned above, it is difficult to obtain the product in a fibrous form and to eliminate such defects as decrease of the digestive ratio and the nutritive value, browning, bitter taste, or the like.

In the above our Japanese Patent Application No. 46159/1976, there has been attempted to obtain an orientated gel in the fibrous form by previously carrying out a specific fibrillation before the heat-treatment. However, the prior process has not completely eliminated the above defects.

Under these circumstances, the present inventors have intensively studied how to obtain an orientated fine fibrillar structure gel having excellent texture properties by controlling the denaturation, decomposition and degradation of the protein on heating and have found that a fibrous high-protein food, maintaining a fine fibrillar structure and also having excellent chewiness, elasticity and stability to hot water cooking, may be prepared without spoiling the digestive ratio and the nutritive value by pre-stabilizing a fibrous milk protein composition in an acidic bath under specific conditions and then, actually stabilizing the resultant in a saline bath under specific conditions.

Using an isolated soy bean protein, there has been disclosed in Japanese Patent Publication No. 30141/1976 that a fibrous protein composition is stabilized by subjecting it to a drawing-treatment of 50 to 400% in a saline bath at a temperature of higher than 60° C. (at 80° to 90° C. in Example thereof) after treating in an acidic bath. However, the functions of this method quite differ from those of the present invention since this method is ineffective when the drawing-treatment of more than 50% is not carried out and dephosphorylation effects as mentioned hereinafter do not take place under the conditions as described in the claims and specification of the above publication.

In the present invention, there takes place a specific reaction of a milk protein. That is, when a milk protein is heated in a saline bath at 90° to 130° C. for more than 20 minutes, a protein gel having high chewiness is formed by intra-protein reaction accompanied by association with water as the result of dephosphorylation of the protein, whether a drawing treatment is carried out or not. Thus, the properties of the product are superior to those of the product in the prior art by utilizing the optimum combination of the specific condition of such intra-protein reaction hereinbefore and a specific treating condition in an acidic bath which inhibits the disappearance of a fine fibrillar structure by becoming amorphous on heating.

An object of the present invention is to provide an improved process for producing a fibrous high-protein food from a starting milk material such as a milk, a skim milk, a casein or the like.

Another object of the present invention is to provide an improved method for stabilizing a fibrous milk protein composition in two steps using an acidic bath and a saline bath.

These and other object of the present invention will be apparent from the following description.

According to the present invention, the desired meat-simulating, fibrous high-protein foods can be produced from a starting milk material such as a milk, a skim milk, a casein or the like, by the steps consisting (1) converting the starting milk material into a fibrous composition by a known method such as gelling the starting milk material and applying a stress to the resulting gel composition; (2) after or during the conversion step, pre-stabilizing the resulting fibrous composition in an acidic bath of pH 0 to 5 containing 0.5 to 25% by weight of one or more specific acidic compounds for 10 seconds to 5 minutes; and then (3) actually stabilizing the resultant in a saline bath of pH 2.5 to 6.5 containing at least one of salts selected from a potassium salt, a sodium salt, or a calcium salt in an amount of 0.3 to 6 gram equivalents/L as the total cation concentration of the bath, at 90° to 130° C. for 20 minutes to 3 hours.

As shown in the following Table 1, the product of the present invention has the excellent properties of the degree of fine fibrillar structure (fibril property), chewiness (compressive breaking maximum stress), elasticity (extensibility), water retention and heat stability superior to those of the products in the prior art such as Japanese Patent Publication No. 30141/1976 and Japanese Patent Application No. 46159/1976.

Table 1

| Properties | Present Invention | Japanese Patent Appln. No. 46159/'76 | Japanese Patent Pub. No. 30141/'76 (using casein) |
| --- | --- | --- | --- |
| Fibril property | maintained | disappeared | maintained |
| Compressive breaking max. stress | improved | improved | not improved |
| Extensibility | improved | improved | improved |
| Water retention | improved | improved | improved |
| Heat stability | improved | improved | not improved |

[Note]:
The results shown in Table 1 are the improvements of the properties observed after the treatment in a saline bath.

Additionally, the product of the present invention may be preservable even at room temperature for a long time and when dried, it is possible to preserve for an even longer time, since the product contains one or more salts which may be desalted by washing with water, preferably with warm water of about 40° C., just before using. Therefore, the product of the present invention is readily handled.

Moreover, the denaturation, decomposition and degradation of the protein are nsignificant, the digestive ratio and the nutritive value of the product are hardly decreased and side reactions such as browning and becoming bitter are not observed, since the treatments of the present invention may be carried out at a relatively lower temperature in comparison with the treating conditions described in the above report of Thomas et al and Japanese Patent Application No. 46159/1976.

The term "the starting milk material" used herein means a member selected from the group consisting of (a) a milk (e.g. cow's milk),
(b) a skim milk,
(c) a concentrate of (a) or (b),
(d) a dried product of (a) or (b),
(e) a milk protein such as casein, coprecipitated casein, whey protein or the like, and
(f) a protein mixture containing (e).

The starting milk material is commonly used in the form of a micellar structural composition or a solution dissolving it in an aqueous solution of an alkali metal salt (e.g. sodium hydroxide, pottasium carbonate, etc.) an alkaline phosphate (e.g. sodium phosphate, etc.), ammonia, or the like. The micellar structural composition of the starting milk material may be prepared, for example, by treating casein or a protein mixture containing casein with a multivalent metal ion. The starting milk material may also contain another nonfibrous animal or vegetable protein (e.g. gelatin, a blood powder, a soy bean protein, gluten, etc.). Further, optionally, the starting milk protein may have added thereto animal or vegetable fats and oils (e.g. cream, tallow, lard, a fish oil, a whale oil, soy bean oil, cotton seed oil, palm oil, coconut oil or a hardened oil thereof, etc.) and/or a carbohydrate (e.g. a starch, dextrin, gum arabic, okra gum, alginic acid, ghatti gum, curdlan, carrageenan, karaya gum, xanthan gum, agar, guar gum, konjak-mannan, tragacanth gum, furcellaran, pectin, etc.).

The conversion of the starting milk material into a fibrous composition may be carried out by a known method.

For instance, the starting milk material in the form of a micellar structural composition, a solution or a mixture with a nonfibrous animal or vegetable protein, a fat, a oil and/or a carbohydrate may be converted into a fibrous composition by extruding it from a spinneret. Alternatively, the above solution or mixture of the starting milk material may be converted into a fibrous composition by adding thereto calcium ions or a magnesium ions to form micelles and treating the resulting micelles with a proteolytic enzyme such as a protease, trypsin, chymotrypsin, papain, milcozyme or the like to give a gel composition; or (b) adjusting the pH value thereof to 5.0 to 6.5 and heating it to give a gel composition; or (c) treating the solution or mixture with a reducing agent such as sodium bisulfite or β-mercaptoethanol to give a gel composition; and then applying a stress to the resulting gel composition to form an orientated fibrillar composition. The stress applied to the gel composition includes various mechanical stress, for instance, by drawing between two or more rollers, processing with rollers, extruding with a screw, mixing, extruding at a high speed (e.g. jetting), or the like.

Firstly, the fibrous composition thus obtained is pre-stabilized in a pre-stabilization bath (an acidic bath) whereby the inhibition of the disappearance of the fine fibrillar structure on heating is effected.

The present inventors have studied the formulation of the pre-stabilization bath useful in the present invention.

A fibrous composition was prepared by dissolving an acid casein in an aqueous ammonia solution, adding thereto calcium chloride to form micellar structural composition, treating the micelle with milcozyme to give a gel composition, and extending the resulting gel composition to give a fibrous composition. The fibrous composition was dipped into a pre-stabilization bath of various fomulations at room temperature for 3 minutes. The fibrous composition thus treated was dipped into an actual stabilization bath (a saline bath) of pH 4.2 to 4.3 containing 17.4% by weight of sodium chloride at 103° C. for 15 minutes to 2 hours, and then, the degree of maintained fibrillar structure, stability to hot water cooking, compressive breaking maximum stress and phosphorus content (based on the anhydrate) of the resultant product were determined. The results are shown in the following Table 2.

Table 2

| Formulation | Time for the treatment in the saline bath (hours) | Degree of maintaining the fibrillar structure* | Stability to hot water cooking** | Compressive breaking max. stree*** (kg) | Phosphorus content (%) |
|---|---|---|---|---|---|
| 5%-acetic acid | 0.25 | A | D | 4 | |
| | 0.5 | B | C | 4.5 | |
| | 1 | B | B | 6 | |
| | 2 | B | B | 6 | 0.71 |
| 2%-lactic acid | 0.25 | D | E | 1.5 | |
| | 0.5 | E | E | 2 | |
| | 1 | D | D | 2 | |
| | 2 | D | D | 3 | 0.69 |
| 2%-citric acid, 1.1%-sodium citrate (pH 3.5) | 0.25 | A | D | 1.6 | |
| | 0.5 | A | D | 2 | |
| | 1 | A | C | 3 | |
| | 2 | B | B | 5 | 0.67 |
| 3%-succinic acid, 1%-disodium succinate (pH 3.6) | 0.25 | A | E | 1.5 | |
| | 0.5 | A | D | 2 | |
| | 1 | B | C | 3 | |
| | 2 | B | B | 5 | 0.68 |
| 3%-fumaric acid | 0.25 | A | D | 2.5 | |
| | 0.5 | A | D | 3 | |
| | 1 | B | C | 4.5 | |
| | 2 | B | B | 5 | 0.68 |
| 2%-tartaric acid, 4%-disodium tartarate (pH 3.5) | 0.25 | B | E | 1.8 | |
| | 0.5 | B | E | 2 | |
| | 1 | B | E | 2 | |
| | 2 | B | E | 2 | 0.70 |
| 1%-sulfuric acid | 0.25 | A | D | 4.0 | |
| | 0.5 | A | C | 4.5 | |
| | 1 | A | B | 7 | |
| | 2 | A | A | 8 | 0.56 |
| 1%-hydrochloric acid | 0.25 | A | E | 1.5 | |
| | 0.5 | B | E | 2 | |
| | 1 | C | E | 2 | |
| | 2 | C | D | 4 | 0.70 |
| 1%-phytic acid | 0.25 | A | B | 5.5 | |
| | 0.5 | A | B | 6 | |
| | 1 | A | A | 8 | |
| | 2 | A | A | 9 | 0.74 |
| 5%-sodium hexamethaphosphorate + HCl (pH 2)**** | 0.25 | A | D | 2.5 | |
| | 0.5 | A | C | 3 | |
| | 1 | A | C | 4.5 | |
| | 2 | B | B | 6 | 0.85 |
| 5%-sodium tripoly phosphate + HCl (pH 2)**** | 0.25 | A | E | 2.5 | |
| | 0.5 | A | D | 3 | |
| | 1 | A | C | 3 | |
| | 2 | B | B | 5 | 0.83 |
| 5%-disodium phosphate + sulfuric acid (pH 2) | 0.25 | B | E | 1.5 | |
| | 0.5 | A | D | 2 | |
| | 1 | A | C | 3 | |
| | 2 | B | B | 4.5 | 0.80 |
| 5%-sodium sulfate + sulfuric acid (pH 1.5) | 0.25 | B | D | 1.5 | |
| | 0.5 | A | C | 2 | |
| | 1 | A | B | 2 | |
| | 2 | B | B | 2 | 0.78 |
| 5%-sodium glutamate + sulfuric acid (pH 3.6) | 0.25 | A | D | 1.5 | |
| | 0.5 | A | C | 2 | |
| | 1 | A | B | 3 | |
| | 2 | B | B | 4.5 | 0.72 |

[Note]:
*The symbols in the degree of maintaining the fibrillar structure are as follows:
A: More than 90% of the fine fibrillar structure is maintained.
B: 60 to 90% of the fine fibrillar structure is maintained.
C: 30 to 60% of the fine fibrillar structure is maintained.
D: The fine fibrillar structure is slightly maintained.
E: The fine fibrillar structure is completely disappeared.
**The stability to hot water cooking was estimated by observing the degree of maintaining the fine fibrillar structure of the specimen after dipping it into a hot water bath at 80° C. for 20 minutes. The results are shown by the same symbols as the above symbols for the degree of maintaining the fibrillar structure.
***The compressive breaking maximum stress was determined by a compression test of a specimen having a thickness of 20 mm using a simulating stainless steel teeth (width of 10 mm, height of 12 mm, thickness of 5 mm, and tip angle of 100°).
****HCl was added in order to lower the pH value of the bath.

As is made clear from the above Table 2, the acids used as the pre-stabilization bath components of the present invention remarkably differ from those generally used for stabilization of a fibrous protein composition in the prior art. Thus, it has now found that the acids commonly used for stabilization of a fibrous protein composition such as hydrochloric acid or lactic acid are unexpectedly ineffective for maintaining the fine fibrillar structure during the treatment in the actual stabilization bath of the present invention. It is assumed that only certain kinds of acids may be effective to retain enough bonded molecules to stabilize the surface of the fibril until the strength of the fibril becomes sufficient by a dephosphorylation reaction taking place inside the protein, since the removal behavior of the acid, used in the pre-stabilization bath, in an actual stabilization bath is varied with the kind of acid, particularly the ionization constant thereof, the degree of association with the protein, and the kind of groups to which the acid is bonded.

In consideration of the degree of maintaining the fine fibrillar structure, stability to hot water cooking and compressive breaking maximum stress, the acidic compounds useful as the pre-stabilization bath components in the present invention include acetic acid, citric acid, succinic acid, fumaric acid, glutamic acid, sulfuric acid, phosphoric acid, and other acidic compounds such as phytic acid, hexamethaphosphoric acid, tripolyphosphoric acid, or the like, or a salt thereof, preferably, acetic acid, sulfuric acid, phytic acid, hexamethaphosphoric acid, or a salt thereof. These compounds may be used alone or in a combination of two or more thereof and may be used together with another acid such as hydrochloric acid. Moreover, other acidic compounds of phosphoric acid such as a condensate of phosphoric acids having more than two phosphoric acid groups (e.g. sodium pyrophosphate, sodium ultraphosphate, etc.) and an esterified compound having more than two phosphoric acid groups in a molecule (e.g. glyceryl diphosphate, fructose diphosphate, starch phosphate, etc.) may also be used for the pre-stabilization bath components. The stability to hot water cooking of the product may be more improved by using the above acidic compounds of phosphoric acid together with sulfuric acid. Likewise, the elasticity of the product may be more improved by using the above acidic compound of phosphoric acid together with at least one of emulsifying agents such as lecithin; a sucrose fatty acid ester; mono- or di-glyceride of stearic acid, oleic acid, and palmitic acid; sorbitan monostearate; or the like.

It should be noted that the phosphorus content of the product of the present invention is lowered to 0.7 to 0.85% after the treatment in the actual stabilization bath, though the phosphorus content before the treatment is as high as about 2% when a compound containing one or more phosphorus atoms such as phytic acid, hexamethaphosphoric acid, or the like is used for the pre-stabilization bath components (When an acid containing no phosphorus atom is used, the phosphorus content is about 0.9% before the treatment.).

The acid concentration of the pre-stabilization bath should be 0.5 to 25% by weight since, when the concentration is lower than 0.5% by weight, the stabilization is insufficient and when more than 25% by weight, the fine fibrillar structure disappears by adhering fibrils to each other. The pH value of the pre-stabilization bath should be 0 to 5 since,, when the pH value is lower than 0 or more than 5, the fine fibrillar structure disappears by dissolving the surface of the fibril and adhering to each other. The time for the treatment in the pre-stabilization bath should be 10 seconds to 5 minutes since, when the time is shorter than 10 seconds, the stabilization is insufficient and when the time is longer than 5 minutes, the apparatus for the treatment is too large and a large amount of the bath components is needed.

The pre-stabilization step may be carried out at 0° to 60° C., preferably at room temperature.

In the present invention, the fibrous composition treated in the pre-stabilization bath is actually stabilized in an actual stabilization bath (a saline bath).

It has been known that a hydrolysis of a milk protein such as casein hardly takes place at a temperature of lower than 110° C. and that a dephosphorylation reaction owing to dissosiation of a phosphoserine residue takes place by heating at 110° to 140° C. for a long time. For instance, about 27% by weight of phosphorus which is contained in casein is removed by heating at 120° C. for 30 minutes (cf. Belec and Jenness, J. Dairy Sci., Vol. 45, Page 20 (1962), etc.).

However, in fact, it is difficult to apply this phenomenon to improvement of stabilization of a fibrous protein composition. That is, the dephosphorylation rate is remarkably decreased in comparison with that in a solution state since the surface of the fiber or fibril is preferentially coagulated by heating at more than 120° C. and the surface thereof dissolves and adheres to each other.

It has now been found that the dephosphorylation reaction proceeds in the same degree as or more effectively than that in a solution state without spoiling the fine fibrillar structure by treating a fibrous protein composition in a saline bath containing an alkali or an alkali earth metal salt and that the temperature of the bath may be lowered (90° to 130° C.) than the case using no salt.

The present invention have carried out the following test to make clear the relationship between the gellation of a milk protein at a high temperature as described by the above Thomas et al and the dephosphorylation reaction at a high temperature as described by the above Belec et al.

A fibrous composition containing fibrils, having a compressive breaking maximum stress of about 4.5 kg was prepared by dissolving an acid casein in an aqueous ammonia solution, adding thereto calcium chloride to form a micellar structural composition, treating the micelle with milcozyme to give a gel composition, extending the resulting gel composition to form a fibrous composition, dipping the resulting fibrous composition into an acidic bath containing 5% by weight of acetic acid and 1% by weight of sulfuric acid at room temperature for 3 minutes and then, after washing with water, neutralizing the product with an alkali to pH about 7. The compressive breaking maximum stress was determined in the same manner as described in Table 2. Then, the fibrous composition thus obtained was dipped into a hot water bath at 110° C. or 120° C. and the relationship between the time for treatment and the phosphorus content of the obtained fibrous casein, the degree of maintaining the fine fibrillar structure, and the compressive breaking maximum stress of the product were determined.

In the accompanying FIG. 1, there is shown the relationship between the time for the treatment in the hot water bath and the dephosphorylation ratio (shown by a percentage of the removed phosphorus based on the total phosphorus content at the beginning of the dipping) or the degree of maintaining the fine fibrillar structure. The symbols used for the degree of maintaining the fine fibrillar structure mean the same as in Table 2. The figures used in FIG. 1 mean the temperature of the bath (lefthand of the hyphen) and the pH value of the bath (righthand of the hyphen). The curves in FIG. 1 show the dephosphorylation ratio determined by dephosphorylating a 3% aqueous solution of sodium α-caseinate at pH 6.68 at 110° C., 120° C., and 130° C., respectively, according to the method described in the above report.

In the following Table 3, there are shown dephosphorylation ratio, degree of maintaining the fine fibrillar structure, compressive breaking maximum stress, and stability to hot water cooking of products obtained under various conditions. The symbols used for the degree of maintaining the fibrillar structure and the stability to hot water cooking mean the same as in Table 2.

Table 3

| Hot water bath condition | | | Dephospho- rylation ratio (%) | Degree of maintaining the fibil- lar struc- ture | Stability to water cooking | Compressive breaking max. stress (kg) |
| --- | --- | --- | --- | --- | --- | --- |
| Temp. (°C.) | pH | Time for treatment (min.) | | | | |
| 110 | 7 | 30 | 0.9 | B | D | 3 |
|  |  | 90 | 3.8 | C | C | 3 |
|  | 4.2 | 30 | 5.0 | B | C | 4 |
|  |  | 90 | 2.7 | B | B | 4.5 |
| 120 | 7 | 30 | 5.0 | E | E | 2 |
|  |  | 90 | 23.5 | E | E | 2 |
|  | 4.2 | 30 | 11.3 | B | D | 3 |
|  |  | 90 | 29.4 | B | D | 3 |

As is made clear from FIG. 1 and the above Table 3, when the treatment is carried out in the hot water bath of pH 7, the temperature is higher and the time is longer, the dephosphorylation ratio is higher while the degree of maintaining the fine fibrillar structure is lowered. However, as shown in FIG. 1, the dephosphorylation ratio is remarkably lower than that of using an aqueous solution of casein. It is assumed that, in case of a fibrous composition, the phosphoric acid groups of the intrafiber are hardly removable owing to disappearance of the fibrillar structure by treatment in the hot water bath. The compressive breaking maximum stress is lower than that of before the treatment with hot water (4.5 kg) and the temperature of the treatment is higher, the compressive breaking maximum stress is lower. It is believed that these results are a result of the breaking of the intermolecular bond of the product by the treatment.

According to the study on the effect of pH, when the pH value of the bath is lower than 3.4 or higher than 5.6, the fine fibrillar structure disappears by dissolving and adhering the fibrils to each other and the dephosphorylation ratio and the compressive breaking maximum stress are lowered as those at pH 7. When the pH value is 3.4 to 5.6, the dephosphorylation ratio is higher than that at pH 7 and a little improvement in the degree of maintaining the fine fibrillar structure and the compressive breaking maximum stress is observed as shown in FIG. 1 and Table 3 (pH 4.2). However, the dephosphorylation ratio is lower than that in an aqueous solution state and the compressive reaking maximum stress is the same as or inferior to that before the treatment since the degree of maintaining the fine fibrillar structure is insufficient.

The present inventors have further studied the effect of addition of a salt using sodium chloride and have found that the extensibility of the product is lowered, the product becomes brittle and the fine fibrillar structure disappears at the pH value of lower than 2.5, and that at the pH value of higher than 6.5, the strength of the product is lowered to that before the pre-stabilization. When the pH value of the bath is adjusted to 2.5 to 6.5, preferably 3.4 to 5.6, a fibrous protein product having excellent chewiness, elasticity, and stability to hot water cooking can be prepared, since the degree of maintaining the fine fibrillar structure and the dephosphorylation ratio are remarkably improved and the compressive breaking maximum stress is unexpectedly increased higher than that before the actual stabilization in the saline bath. Moreover, it has been found that the fibrous protein product prepared under the specific conditions does not show browning, decrease of nutritive value or a bitter taste.

Figure 2:
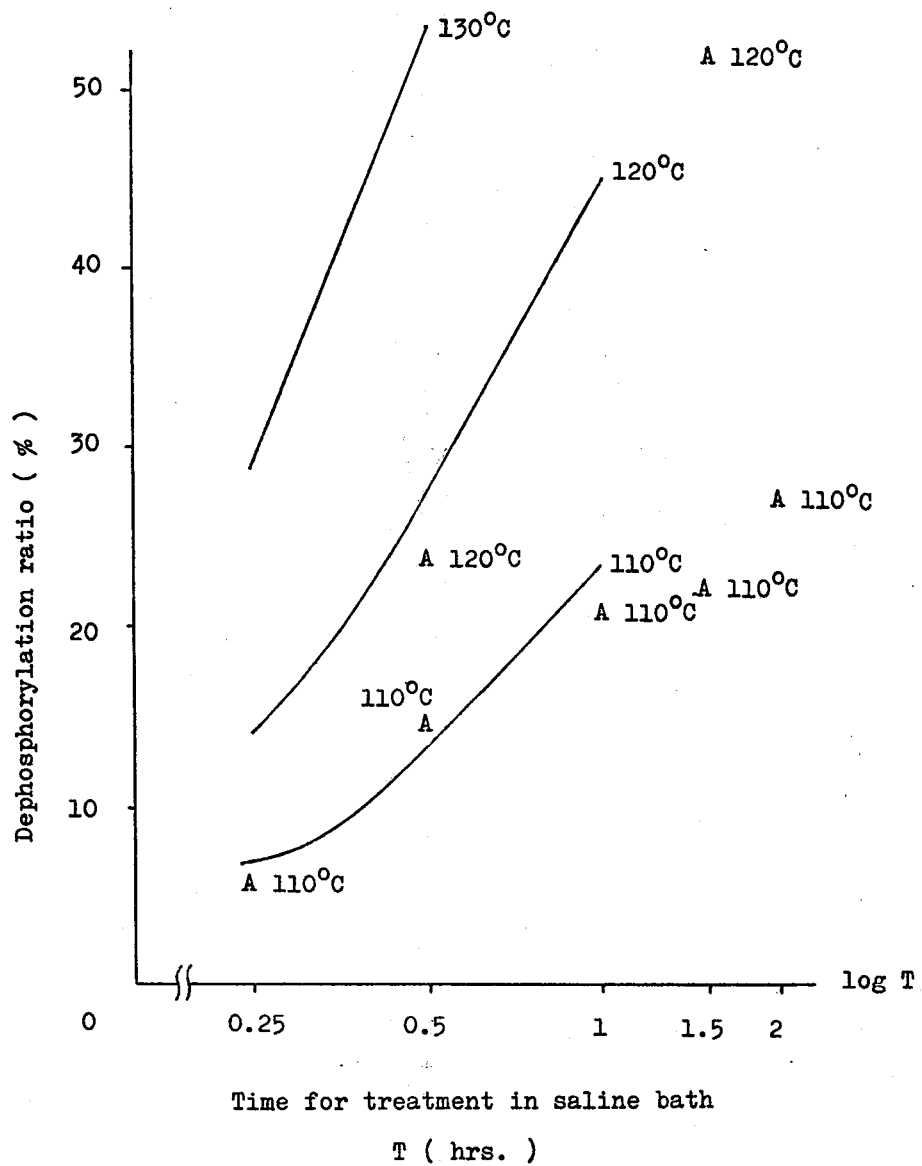
Figure 3:
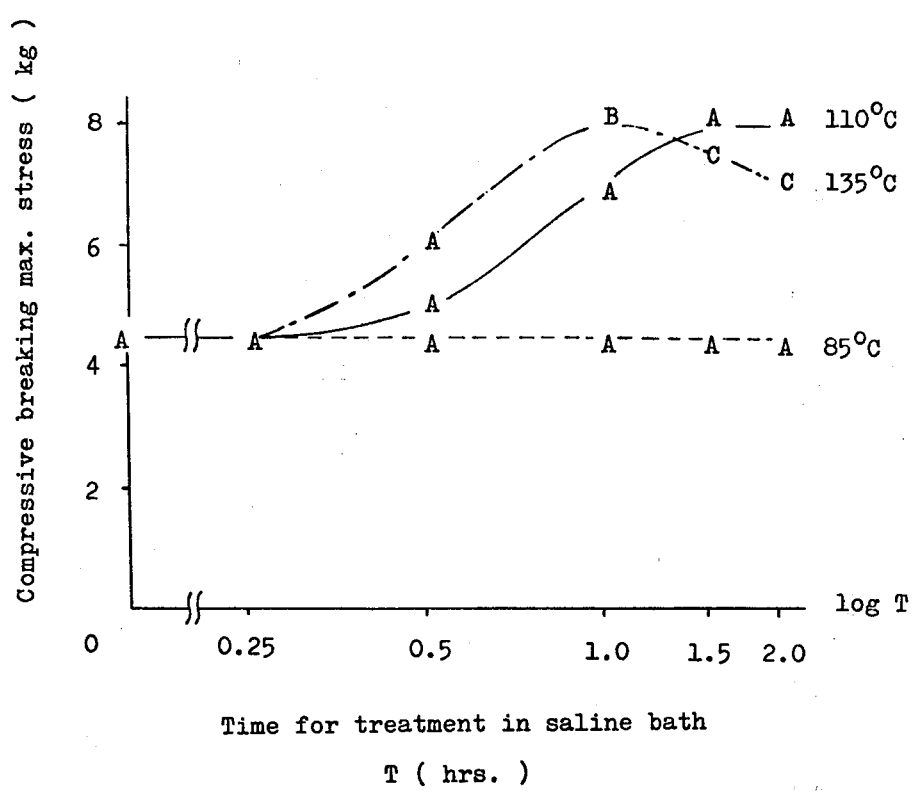

For instance, when a fibrous composition, prepared under the same conditions as above, was pre-stabilized by dipping it into an acidic bath containing 1% of sulfuric acid and 5% of acetic acid at room temperature for 3 minutes and then actually stabilized in a saline bath of pH 4.2 to 4.3 containing 17.4% by weight of sodium chloride at 110° C. and 120° C., respectively, the product showed the properties as shown in the accompanying FIGS. 2 and 3 and following Table 4. In FIG. 2, there is shown the relationship between the time for the actual stabilization in the saline bath and the dephosphorylation ratio or the degree of the fine fibrillar structure. In FIG. 3, there is shown the relationship between the time for treatment in the saline bath and the compressive breaking maximum stress or the degree of maintaining the fine fibrillar structure at the temperature of 85°, 110°, and 135° C., respectively. The symbols used for the degree of maintaining the fine fibrillar structure in FIGS. 2 and 3 mean the same as in Table 2. There is also shown the relationship between the actual stabilization conditions of the saline bath and the dephosphorylation ratio, the degree of maintaining the fine fibrillar structure, stability to hot water cooking, or the compressive breaking maximum stress in Table 4.

Table 4

| Saline bath conditions | | | Dephospho- rylation ratio (%) | Degree of maintain- ing the fibrillar structure | Stability to hot water cooking | Compressive breaking max. stress (kg) |
| --- | --- | --- | --- | --- | --- | --- |
| Temp. (°C.) | Conc. of NaCl | Time for treat- ment (min.) | | | | |
|  | 0 | 30 | 5.0 | B | C | 4 |
|  |  | 90 | 2.7 | B | B | 4.5 |
|  |  | 15 | 6.5 | A | B | 4.5 |
| 110 |  | 30 | 13.6 | A | B | 5 |
|  | 17.4 | 60 | 21.0 | A | A | 7 |
|  |  | 90 | 22.9 | A | A | 8 |
|  |  | 120 | 27.3 | A | A | 8 |

Table 4-continued

| Saline bath conditions | | | Dephospho-rylation ratio (%) | Degree of maintaining the fibrillar structure | Stability to hot water cooking | Compressive breaking max. stress (kg) |
|---|---|---|---|---|---|---|
| Temp. (°C.) | Conc. of NaCl | Time for treatment (min.) | | | | |
| 120 | 0 | 30 | 11.3 | B | D | 3 |
|  |  | 90 | 29.4 | B | D | 3 |
|  | 17.4 | 30 | 23.9 | A | A | 5 |
|  |  | 90 | 51.9 | A | A | 8 |

As is made clear from FIG. 2 and Table 4, the degree of maintaining the fine fibrillar structure is remarkably improved and the dephosphorylation ratio of the fiber is increased to the same degree as that in the aqueous solution state owing to the addition of sodium chloride. The reason for this favorable result may be assumed to be that the active specific surface area of the fiber, which is necessary to disperse the hot water and to react the fiber with the hot water (whereby the internal dephosphorylation reaction proceeds), may be maintained as high as in an aqueous solution state owing to the prevention of the disappearance of the fibril or the orientated structure, and as the result, the initial gradient of a removal rate of phosphoric acid may be retained, even if more than one hour elapsed.

When the relationship between the dephosphorylation effects and the strength of the fiber (compressive breaking maximum stress) are judged from FIG. 3, it is clear that no improvement is observed within 15 to 30 minutes of the treatment which is a dead zone and that, only in case of the treatment at the temperature of more than 90° C., the strength of the fiber is increased and reaches; a maximum within 1 to 2 hours and thereafter decreases. On the other hand, when treating at 85° C., no dephosphorylation is observed and the fine fibrillar structure is maintained, while no improvement in the strength is observed. Thus, it is assumed that this phenomenon has a close relation to the dephosphorylation reaction and probably is due to a crosslinking or association reaction of inter-protein molecules with the progression of the dephosphorylation reaction, while the functional mechanism of the reaction is not clear. Therefore, this reaction completely differs from the function for improving the strength under the conditions as described in Japanese Patent Publication No. 3014/1976.

Moreover, it is clear that the reaction completely differs from a short time operation such as a mechanical extension, since the considerable long time dead zone is present in the treatment of the present invention. It is assumed that the dead zone for a constant time occurs because the decrease of the strength owing to the dispersion and disassociation of the acid which has pre-stabilized the fibril surface overcomes the increase of the strength owing to the dephosphorylation. Further, the compressive breaking maximum stress reaches a maximum on or before the saturating point of the dephosphorylation reaction and then decreases slowly since the acidic hydrolysis of the protein proceeds little by little under a weak acidic condition. It is clear that the hydrolysis rate is more greatly effected by temperature and pH than by the dephosphorylation rate since the compressive breaking maximum stress at 135° C. reaches a maximum more quickly than at 110° C. and then decreases quickly. Therefore, in order to obtain a product having excellent strength and degree of maintaining the fine fibrillar structure, it is important to select the conditions under which the dephosphorylation reaction proceeds at a sufficiently low temperature, for as short time as possible.

The present inventors have studied the temperature of the actual stabilization bath in the above method wherein a fibrous protein composition is pre-stabilized by dipping it into the acidic bath and then actually stabilized by dipping it into the actual stabilization bath and have found that a strength higher than that before the treatment in the saline bath is not obtained at the temperature of lower than 90° C. while the fine fibrillar structure is maintained as mentioned above. Moreover, it has been found that the degree of maintaining the fine fibrillar structure is decreased at a temperature of more than 130° C. and browning, decrease of nutritive value, and a bitter taste are brought by excessive heat denaturation. Accordingly, the temperature of the actual stabilization bath should be 90° to 130° C., preferably 100° to 120° C.

As mentioned above, the strength of the fiber is not improved within 15 minutes of the treatment in the saline bath, but thereafter starts to increase, and it reaches a maximum value within 1 to 2 hours of the treatment. However, it is undesirable to carry out the treatment in the saline bath for over 3 hours, since an improvement of the strength of the fiber is no longer attained, but on the contrary, remarkable defects such as decrease of the degree of maintaining the fine fibrillar structure, browning, decrease of nutritive value, a bitter taste, or the like are brought by excessive heat denaturation. Accordingly, the time for the actual stabilization in the saline bath should be 20 minutes to 3 hours, preferably 40 minutes to 2 hours.

It is desirable to adjust the pH value of the actual stabilization bath to the above acidic range of 2.5 to 6.5, preferably 3.4 to 5.6, including the isoelectric point of the milk protein (4.6). That is, under the strong acidic conditions, the fiber becomes brittle quickly and disappears by hydrolysis of the protein chain which takes place before or together with dephosphorylation. In an experimental study, regardless of the conditions of the pre-stabilization, the fine fibrillar structure becomes brittle and disappears at a pH value of lower than 2.5, especially lower than 2.0, with the lapse of time and no improvement of strength of the product by dephosphorylation is observed. On the other hand, as increase of the pH value of the bath to neutral, dephosphorylation is inhibited. Consequently, only the reaction which the fixed anion is lost by an alkaline ion proceeds on the surface of the fiber and the strength of the fiber is lowered simply to that before the pre-stabilization. In the experimental study, this tendency is observed at a pH value of higher than 6.5, especially higher than 7.0. Usually, the pH value of the actual stabilization bath is slowly lowered by the removal and diffusion of hydrogen ion absorbed in the fiber during the pre-stabilization. In practice, therefore, it is desirable to previously adjust the pH of the bath higher within a certain range at initiation of the actual stabilization according to the conditions of the pre-stabilization or to add an alkali intermittently during the first half step of the actual stabilization.

The salts used for the actual stabilization in the actual stabilization bath include a sodium salt such as sodium chloride, sodium sulfate, or sodium acetate; a potassium salt such as potassium chloride, potassium sulfate or potassium acetate; and a calcium salt such as calcium chloride, calcium sulfate, or calcium acetate, which may be used alone or in a combination of two or more thereof.

It is desirable that the concentration of the salt in the actual stabilization bath is 0.3 to 6, preferably 0.5 to 5 gram equivalents/L as the total cation concentration of the bath. When the concentration of the salt is lower than 0.3 gram equivalents/L (in case of using sodium chloride, 2 % by weight), it is difficult to maintain the fine fibrillar structure and the compressive breaking maximum stress is not improved. When the concentration of the salt is more than 6 gram equivalents/L (in case of using soidum chloride, 29% by weight), the subsequent treatment is complicated since the salt is liable to precipitate in the bath and the precipitate adheres to the fibrous composition to be treated.

Besides, with respect to a process for producing a fibrous protein food without the treatment in the saline bath, the present inventors have already found a process for producing a fibrous high-protein food from a starting milk material such as a milk, skim milk, a casein, or the like by the steps consisting (a) treating the starting milk material with a multivalent metal ion to form a micellar structural composition; (b) treating the resulting micelle with a proteolytic enzyme to give a gel composition; (c) orientating the resulting gel by applying thereto a stress to yield a fibrous composition; and (d) after or during the orientation step, stabilizing the resulting fibrous composition, (i) in an aqueous solution of pH 0.5 to 5 containing at least one of the condensates or esterified compounds of phosphoric acid which contain two or more phosphoric acid groups in a molecule and optionally, adding thereto sulfuric acid; or (ii) in an aqueous solution of pH 0 to 5 containing at least one of the condensates or esterified compounds of phosphoric acid which contain two or more phosphoric acid groups in a molecule and at least one of emulsifying agent (Japanese patent application Nos. 157163/1975 and 157162/1975). However, when the treatment in the saline bath is not carried out, the dephosphorylation ratio, the degree of maintaining the fine fibrillar structure, the stability to hot water cooking, and the compressive breaking maximum stress are still insufficient and the taste tends to be astringent (cf. 0% of sodium chloride concentration in Table 4). Therefore, it is very advantageous to stabilize the fibrous composition in two steps using the acidic bath and the saline bath according to the present invention.

To the product of the present invention may also be added other appropriate additives such as pigments, seasonings, flavors, or the like in order to improve the appearance, the taste, the texture, or the like.

The present invention is illustrated by the following Examples but is not limited thereto.

EXAMPLE 1

To a suspension of acid casein (25 g) in warm water (100 ml) at 50° C. is added 28% aqueous ammonia (1.3 ml) to give a solution. To the solution is added 25% aqueous calcium chloride solution (10 ml) to form a micellar structural composition. The micelle is treated with milcozyme (20 mg) to give a gel composition. The resulting gel composition is orientated and fibrilated by drawing to give a fibrous composition. Then the resulting fibrous composition is stabilized by dipping it into an aqueous solution (1 L) containing 8% by weight of sulfuric acid at room temperature for 1 minute followed by dipping into a saline bath of pH 2.9 to 3.1 containing 20% by weight of sodium chloride at 103° C. for 2 hours. After washing with warm water of about 40° C. and draining off the water, there is obtained a fibrous protein product having a water content of 66% by weight (about 70 g).

The degree of maintaining a fine fibrillar structure of the product is more than 90%. When the product is treated in a hot water bath at 80° C. for 20 minutes, the fine fibrillar structure is almost maintained and the product shows an excellent stability to hot water cooking. Moreover, the compressive breaking maximum stress of the product is improved from 4.0 kg (before the treatment in the saline bath) to 9.5 kg (after the treatment).

EXAMPLE 2

Under the same conditions as described in Example 1, a fibrous composition is prepared by drawing a gel composition. The resulting fibrous composition is stabilized by dipping it into an aqueous solution (1 L) containing 8% by weight of sulfuric acid at room temperature for 1 minute followed by dipping into a saline bath of pH 6.0 to 6.2 containing 20% by weight of sodium chloride at 103° C. for 3 hours. After washing with warm water of about 40° C. and draining off the water, there is obtained a fibrous protein product having a water content of 65% by weight (about 70 g).

The degree of maintaining a fine fibrillar structure of the product is more than 90%. When the product is treated in a hot water bath at 80° C. for 20 minutes, the fine fibrillar structure is almost maintained and the product shows an excellent stability to hot water cooking. Moreover, the compressive breaking maximum stress of the product is improved from 4.0 kg (before the treatment in the saline bath) to 8.5 kg (after the treatment).

EXAMPLE 3

Under the same conditions as described in Example 1, a fibrous composition is prepared by drawing a gel composition. The resulting fibrous composition is stabilized by dipping it into an aqueous solution (1 L) containing 1% by weight of sulfuric acid and 0.5% by weight of phytic acid at room temperature for 3 minutes followed by dipping into a saline bath of pH 4.2 to 4.3 containing 17.4% by weight of sodium chloride at 103° C. for 2 hours. After washing with water and draining off the water, there is obtained a fibrous protein product having a water content of 74% by weight (about 86 g).

The degree of maintaining the fine fibrillar structure of the product is more than 90%. When the product is treated in a hot water bath at 80° C. for 20 minutes, the fine fibrillar structure is almost maintained and the product shows an excellent stability to hot water cooking. Moreover, the compressive breaking maximum stress of the product is improved from 7.5 kg (before the treatment in the saline bath) to 9.5 kg (after the treatment).

EXAMPLE 4

Under the same conditions as described in Example 1, a fibrous composition is prepared by drawing a gel composition. The resulting fibrous composition is stabilized by dipping it into an aqueous solution (1 L) containing 1% by weight of sulfuric acid, 0.5% by weight of phytic acid and 1% by weight of lecithin at room temperature for 3 minutes followed by dipping into a saline bath of pH 4.2 to 4.3 containing 17.4% by weight of sodium chloride at 103° C. for 2 hours. After washing with water and draining off the water, there is obtained a fibrous protein product having a water content of 70% by weight (about 80 g).

The degree of maintaining the fine fibrillar structure of the product is more than 90%. When the product is treated in a hot water at 80° C. for 20 minutes, the fine fibrillar structure is almost maintained and the product shows an excellent stability to hot water cooking as well as an excellent elasticity superior to that of the product in Example 3. Moreover, the compressive breaking maximum stress of the product is improved from 7.5 kg (before the treatment in the saline bath) to 9.6 kg (after the treatment).

EXAMPLE 5

Under the same conditions as described in Example 1, a fibrous composition is prepared by drawing a gel composition. The resulting fibrous composition is stabilized by dipping it into an aqueous solution (1 L) containing 5% by weight of sodium hexamethaphosphate adjusted the pH value to 2 with sulfuric acid for 3 minutes followed by dipping into a saline bath of pH 4.0 to 4.1 containing 28% by weight of sodium sulfate at 104° C. for 2 hours. After washing with water and draining off the water, there is obtained a fibrous protein product having a water content of 72% by weight (about 80 g).

The degree of maintaining the fine fibrillar structure of the product is about 70%. When the product is treated in a hot water at 80° C. for 20 minutes, the fine fibrillar structure of the product is almost maintained and the product shows an excellent stability to hot water cooking. Moreover, the compressive breaking maximum stress of the product is improved from 4.5 kg (before the treatment in the saline bath) to 6.5 kg (after the treatment).

EXAMPLE 6

To a skim milk (1 L) cooled to 5° C. is added with stirring an aqueous solution containing 10% by weight of calcium chloride (8 ml) and the pH value of the resulting mixture is adjusted to 5.0 with acetic acid. When the mixture is heated at 60° C., a gel composition is formed within about 10 minutes and a whey is separated. The resulting gel composition is orientated and fibrilated by extruding with a screw to give a fibrous composition. The resulting fibrous composition is stabilized by dipping it into 5% aqueous acetic acid solution for 3 minutes followed by dipping into a saline bath of pH 4.2 to 4.3 containing 17.4% by weight of sodium chloride at 103° C. for 1 hour. After washing with water and draining off the water, there is obtained a fibrous protein product having a water content of about 70% by weight (about 80 g).

The degree of maintaining the fine fibrillar structure of the product is about 80%. When the product is treated in a hot water at 80° C. for 20 minutes, the fine fibrillar structure of the product is almost maintained and the product shows an excellent stability to hot water cooking. Moreover, the compressive breaking maximum stress of the product is improved from 4 kg (before the treatment in the saline bath) to 6 kg (after the treatment).

EXAMPLE 7

To a 20% aqueous potassium carbonate solution (400 ml) at 50° C. is added casein (100 g) and a soy bean protein having a protein content of 55% by weight (10 g). To the mixture is added a 30% aqueous calcium chloride solution (33 ml) to form a micellar structural composition. Then, the resulting micelle is treated with protease (200 mg) to give a gel composition and the resulting gel is orientated and fibrilated to obtain a fibrous composition. The resulting fibrous composition is stabilized by dipping it into an aqueous solution containing 1% by weight of phytic acid for 3 minutes followed by dipping into a saline bath of pH 3.8 to 3.9 containing 23% by weight of sodium chloride at 105° C. for 1 hour. After washing with water and draining off the water, there is obtained a fibrous protein product having a water content of 75% by weight (about 400 g).

The degree of maintaining the fine fibrillar structure of the product is more than 90%. When the product is treated in a hot water at 80° C. for 20 minutes, the fine fibrillar structure of the product is almost maintained. Moreover, the compressive breaking maximum stress of the product is improved from 4 kg (before the treatment in the saline bath) to 6.5 kg (after the treatment) and the product has an excellent elasticity and an excellent texture.

EXAMPLE 8

An emulsion (2 kg) containing 14% by weight of casein, 13% by weight of gluten and 13% by weight of a shortening oil is extruded from a spinneret having 50 holes (the diameter of each hole is 0.25 mm) to give a fibrous composition. The resulting fibrous composition is stabilized by dipping it into an aqueous solution containing 1% by weight of phytic acid for 3 minutes followed by dipping into a saline bath of pH 4.0 to 4.1 containing 23% by weight of sodium chloride at 105° C. for 1 hour. After washing with water and draining off the water, there is obtained a fibrous protein product having a water content of about 60% by weight (about 1.8 kg).

When the product is treated in a hot water at 80° C. for 20 minutes, the fine fibrillar structure of the product is almost maintained and the product shows an excellent stability to hot water cooking. Moreover, the compressive breaking maximum stress of the product is improved from 3 kg (before the treatment in the saline bath) to 5 kg (after the treatment) and the product has an excellent elasticity and an excellent texture.

What is claimed is:

1. A process for producing a fibrous high protein product, which comprises the steps of (1) converting a solution comprising a milk protein into a fibrous product, (2) after or during the conversion step, prestabilizing the resulting fibrous product in an acidic bath of pH 0 to 5 containing 0.5 to 25% of an acidic compound selected from the group consisting of acetic acid, sulfuric acid, and phytic acid, or admixtures thereof for at least 10 seconds; and then (3) actually stabilizing the resultant fibrous product in a saline bath of pH 2.5 to 6.5 containing at least one salt, selected from the group consisting of a potassium salt, a sodium salt, and a calcium salt in an amount of 0.3 to 6 gram equivalents/L as the total cation concentration of the bath, at 90° to 130° C. for from 1 to 3 hours when acetic or sulfuric acid is used in step (2) and 0.5 to 3 hours when phytic acid is used in step (2).

2. The process according to claim 1, wherein said actual stabilization step (3) is carried out in a saline bath of pH 3.4 to 5.6.

3. The process according to claim 1, wherein said pre-stabilization step (2) is carried out for 10 seconds to 5 minutes.

4. The process according to claim 1, wherein the acid is phytic acid and the phytic acid is used together with an emulsifying agent.

5. The process according to claim 2, wherein said pre-stabilization step (2) is carried out at 0° to 60° C.

6. The process according to claim 1, wherein said actual stabilization step (3) is carried out at 100° to 120° C.

7. The process according to claim 6, wherein said actual stabilization step (3) is carried out in a saline bath of pH 3.4 to 5.6.

8. The process according to claim 1, wherein the salt is a member selected from the group consisting of sodium chloride, sodium sulfate, sodium acetate, potassium chloride, potassium sulfate, potassium acetate, calcium chloride, calcium sulfate and calcium acetate.

9. The process of claim 1 wherein prestabilization is accomplished after the conversion step.

* * * * *